(12) United States Patent
Kranz et al.

(10) Patent No.: US 6,778,510 B1
(45) Date of Patent: Aug. 17, 2004

(54) DIGITAL TELECOMMUNICATION FACILITY

(75) Inventors: Christian Kranz, Ratingen Lintorf (DE); Stefan Heinen, Krefeld (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/149,830

(22) Filed: Sep. 8, 1998

(30) Foreign Application Priority Data

Sep. 8, 1997 (DE) .......................... 197 39 226

(51) Int. Cl.⁷ .................................................. H04Q 7/00
(52) U.S. Cl. .................... 370/328; 370/337; 370/347; 370/465
(58) Field of Search ................................ 370/277, 280, 370/294, 310, 321, 330, 336–337, 345, 347, 442–443, 478, 915, 538; 455/403, 422, 426, 418, 446–465, 39, 74.1; 375/261, 298

(56) References Cited

U.S. PATENT DOCUMENTS

| 4,965,796 A | * | 10/1990 | Petty ........................... 370/538 |
| 5,412,650 A | * | 5/1995 | Davies ........................ 370/347 |
| 5,574,775 A | * | 11/1996 | Miller et al. ................. 455/444 |
| 5,604,744 A | | 2/1997 | Andersson et al. |
| 5,638,405 A | * | 6/1997 | Hendrickson et al. ...... 375/261 |
| 5,719,859 A | * | 2/1998 | Kobayashi et al. ......... 370/347 |

FOREIGN PATENT DOCUMENTS

| EP | 0 333 679 A1 | 9/1989 |
| EP | 0538546 A1 | 4/1993 |
| EP | 0 587 225 A2 | 3/1994 |
| EP | 0671842 A1 | 9/1995 |
| GB | 2 321 160 A | 7/1998 |
| WO | 96/21998 | 7/1996 |

OTHER PUBLICATIONS

Masataka Iizuka: "Design of common access channels for TDMA–TDD microcell communications systems", *1994 44th IEEE Vehicular Technology Conference, Stockholm, Sweden*, Jun. 8–10, 1994, pp. 1180–1183.

"Struktur des DECT-Standards", Ulrich Pilger, Nachrichtentech., Elektron., Berlin 42, 1992, pp. 23–29.

\* cited by examiner

*Primary Examiner*—Frank Duong
*Assistant Examiner*—Melanie Jagannathan
(74) *Attorney, Agent, or Firm*—Laurence A. Greenberg; Werner H. Stemer; Gregory L. Mayback

(57) ABSTRACT

A digital telecommunication facility has a base station and one or more cordless mobile units. The telecommunication facility exchanges data between the mobile units and the base station in units of two or more TDMA frames.

6 Claims, 3 Drawing Sheets

DIGITAL TELECOMMUNICATION FACILITY

BACKGROUND OF THE INVENTION

Field of the Invention

The invention resides in the telecommunications field. More specifically, the invention pertains to a digital telecommunication facility with one or more cordless mobile units.

Such a telecommunication facility is, for example, a radio system operating in accordance with the DECT standard.

The basic configuration of such a radio system is illustrated in FIG. 2:

The system of FIG. 2 includes a base station B and a plurality of cordless telecommunication terminals TE1 to TEn. In the exemplary embodiment, the cordless telecommunication terminals TE1 to TEn are mobile telephones which are capable of communicating with the base station B by radio.

Instead of the cordless telecommunication terminals TE1 to TEn or in addition to these, cordless connection sockets can be used for connecting wire-connected telecommunication terminals. The cordless telecommunication terminals, the cordless connection sockets, and similar facilities constitute the above-mentioned mobile units.

The data transmission between the base station B and the mobile units takes place in units of so-called frames or, more accurately, TDMA frames. The acronym TDMA stands for "Time Division Multiple Access" and signifies that the frames are structured in such a manner that the base station can communicate consecutively in successive time slots (or slots) of a respective frame with all mobile units that are registered with it. The communication can then be effected by utilizing the full bandwidth of the transmission channel. The TDMA process is sufficiently well known and will, therefore, not be explained in further detail. The basic structure of a (TDMA) frame suitable for performing the TDMA process will now be explained with reference to FIG. 3.

The frame shown in FIG. 3, i.e. the DECT full-slot frame considered here, is composed of 24 time slots or slots (full slots) of identical length. The first 12 of the 24 slots are transmitted from the base station to the mobile units and the subsequent, second 12 slots are transmitted from the mobile units to the base station. More accurately, the zeroth slot of each frame is transmitted from the base station to a zeroth mobile unit, the first slot is transmitted from the base station to a first mobile unit, the second slot is transmitted from the base station to a second mobile unit, . . . , the eleventh slot is transmitted from the base station to an eleventh mobile unit. Conversely, the twelfth slot is transmitted from the zeroth mobile unit to the base station, the thirteenth slot from the first mobile unit to the base station, the fourteenth slot from the second mobile unit to the base station, . . . , and the twenty-third slot is transmitted from the eleventh mobile unit to the base station.

One frame, i.e. the 24 slots of a frame, is transmitted within 10 ms. Each slot comprises 480 bits and is transmitted within approximately 417 μs (within 416.66 μs). As indicated in FIG. 3, the 480 bits are distributed over a 32-bit-wide sync field, a 388-bit-wide D field, a 4-bit-wide Z field, and a 56-bit-wide guard space field.

320 bits are reserved within the D field for the transmission of the user data which are actually of interest (for example speech data). The base station can thus send user data comprising 320 bits to each of the mobile units and receive the same amount of user data from each of the mobile units within 10 ms; the transmission rate for user data between the base station and each of the mobile units is therefore 32 kbit/s in each direction.

The DECT standard thus enables high-quality systems to be implemented which can be used in a flexible manner. However, the DECT standard, but also other standards or pseudo standards, cannot always be used everywhere. It is especially because, as a rule, individual governmental regulations must be observed in the various transmitting frequency bands in which such radio systems are allowed to be operated, that, in most cases, completely new radio systems must be developed and implemented for utilizing newly released frequency bands.

This is associated with considerable technical effort, especially in the development of the required electronic components, because the integrated circuits used especially in this case cannot or in any case not easily be used in radio systems operating in a different manner.

SUMMARY OF THE INVENTION

It is accordingly an object of the invention to provide a telecommunications facility, which overcomes the above-mentioned disadvantages of the heretofore-known devices and methods of this general type and which can be obtained in a relatively simple manner from conventional telecommunication facilities even if it is principally designed for different technical requirements.

With the foregoing and other objects in view there is provided, in accordance with the invention, a digital telecommunication facility, comprising:

a base station and at least one cordless mobile unit;

the base station and the at least one cordless mobile unit being adapted to exchange data in units of two or more TDMA frames.

Provision of this feature creates the prerequisite for the capability of handling the data to be exchanged between the mobile units and the base station essentially as in conventional systems where communication takes place in units of individual frames. This is particularly true if, at the same time, the extent of the individual frames (i.e. the number of time slots or slots in the frame) is modified in such a manner that the total number of slots in the several frames treated as a unit is equal to the number of slots of a conventionally used (single) frame.

With an unchanged transmission period per frame, a changed number of slots per frame makes it possible to reduce the amount of data to be transmitted per unit time which is clearly reflected in a reduced bandwidth of the transmission channel.

In accordance with an added feature of the invention, the base station and the at least one mobile unit are TDMA units originally adapted to exchange data in units of individual, single TDMA frames and modified to exchange data in units of two or more TDMA frames.

In accordance with an additional feature of the invention, the base station and the at least one mobile unit are DECT units originally adapted to exchange data in DECT standard.

In accordance with another feature of the invention, a baseband chip for a telecommunication facility operating in the DECT standard is provided for the novel communication in the units of multiple TDMA frames.

In accordance with a further feature of the invention, the TDMA frames are divided into a number of slots, and wherein the units of two or more TDMA frames contain a constant number of slots independent of a number of TDMA frames in each unit.

In accordance with again an added feature of the invention, a structure and an extent of the slots is independent of a number of TDMA frames in each unit.

In accordance with again an additional feature of the invention, a time within which a TDMA frame is transmitted is independent of a number of TDMA frames in each unit.

In accordance with again another feature of the invention, a frequency divider divides a frequency of a bit clock determining a transmission speed of the telecommunication facility. In other words, the transmission of a frame remains the same independently of the number of slots comprised by it if, according to the invention, the (bit) clock with which the individual bits of a slot are sent out or received is changed.

In accordance with a concomitant feature of the invention, the base station and the at least one mobile unit, i.e. the novel telecommunication facility, are adapted to operate in a 2.4 GHz ISM band.

The handling of a number of frames, reduced in extent, as one coherent unit makes it possible in a particularly simple manner to change the bandwidth of the transmission channel and/or to adapt the telecommunication facility in other ways to the individual requirements. In particular, the complete AF part of the telecommunication facility can be taken over essentially unchanged from conventional telecommunication facilities.

As a result, a telecommunication facility operating or operated in this manner can be obtained in a relatively simple manner from conventional telecommunication facilities even though it was originally laid out for different technical specifications.

Other features which are considered as characteristic for the invention are set forth in the appended claims.

Although the invention is illustrated and described herein as embodied in a digital telecommunication facility, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The telecommunication facility described in greater detail in the following text comprises one or more cordless mobile units. In contrast to the above-described DECT standard system, however, it is designed to be used in the so-called 2.4 GHz ISM band which extends from 2400 to 2483.5 MHz. The 2.4 GHz ISM band has recently been released for operating such telecommunication facilities by the FCC (Federal Communications Commission), under certain conditions.

It should be noted, however, that the telecommunication facility according to the invention is suitable not only for use in the 2.4 GHz ISM band, but can also be used within any other frequency band.

Communication between the mobile units and the base station shall take place via TDMA (time division multiple access) frames sent out and received between the units and the station.

In the exemplary embodiment, the TDMA frames have the same fundamental structure as the frames which are used in systems operating in accordance with the DECT standard. However, there is no restriction to this. The frames used can also be TDMA frames used in any other system.

In contrast to conventional systems including the systems operating in accordance with the DECT standard, the mobile units and the base station of the invention are laid out to handle the data exchange in units of two or more TDMA frames.

In the exemplary embodiment the data units comprise two frames each. However, it will be understood that this is not a restriction. The units can basically consist of an arbitrary number of several frames.

Figure 1:
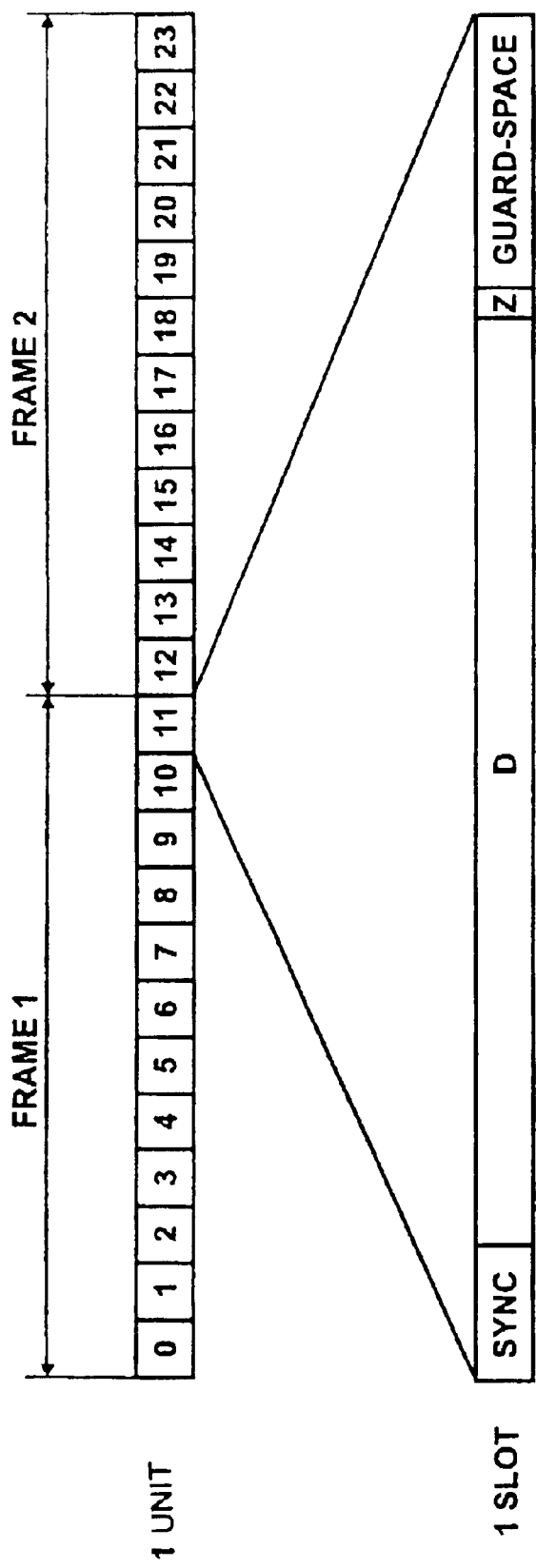
FIG. 1 is a diagrammatic schematic view illustrating a format of the data exchange between a base station and telecommunication terminals communicating with the former, of a telecommunication facility according to the invention.
Figure 2:
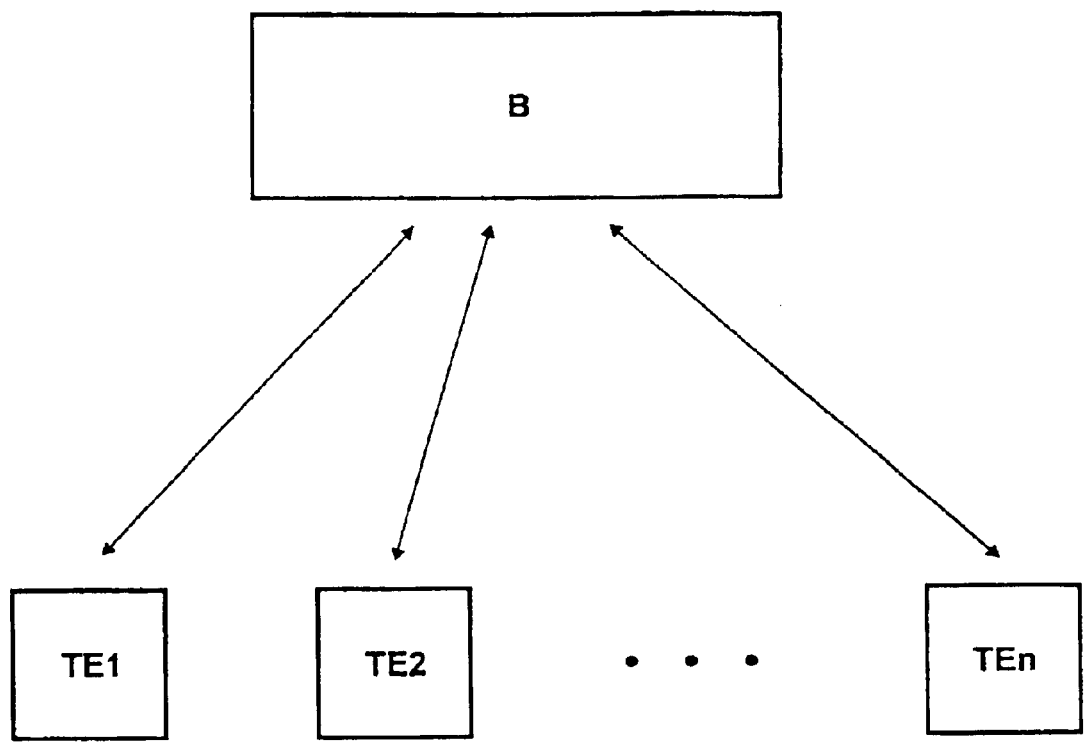
FIG. 2 is a diagrammatic view of a configuration of a radio system operating in accordance with the DECT standard.

Referring now to FIG. 1 in detail, there is shown the structure of a data unit consisting of two frames:

The unit shown in FIG. 1 consists of a first frame (FRAME 1) and an immediately adjacent second frame (FRAME 2). Each of the frames comprises 12 slots of equal length. For the sake of clarity, the total of 24 slots of the two frames are numbered consecutively from 0 to 23, slots 0 to 11 being the slots of the first frame and slots 12 to 23 being the slots of the second frame. The first six slots in each case of each frame are transmitted from the base station to the mobile units and the subsequent six slots in each case are transmitted from the mobile units to the base station. More accurately, the zeroth slot of each frame (i.e. slots 0 and 12) is transmitted from the base station to a zeroth mobile unit, the first slot of each frame (i.e. slots 1 and 13) is transmitted from the base station to a first mobile unit, the second slot of each frame (i.e. slots 2 and 14) is transmitted from the base station to a second mobile unit, . . . , the fifth slot of each frame (i.e. slots 5 and 17) is transmitted from the base station to a fifth mobile unit. Similarly, the sixth slot of each frame (i.e. slots 6 and 18) is transmitted from the zeroth mobile unit to the base station, the seventh slot of each frame (i.e. slots 7 and 19) is transmitted from the first mobile unit to the base station, the eighth slot of each frame (i.e. slots 8 and 20) is transmitted from the second mobile unit to the base station, . . . , and the eleventh slot of each frame (i.e. slots 11 and 23) is transmitted from the fifth mobile unit to the base station.

If so-called slow-hopping radio units are used in the telecommunication facility, the number of mobile units which can be operated from a base station is halved because only every other slot can then be used for data transmission; the remaining slots are the so-called blind slots which are reserved for synchronization or correction of the transmitting and/or receiving frequency oscillators of the base station and/or the mobile units. Incidentally, this is also the case in systems operating in accordance with the DECT standard.

Independently of this, each of the frames combined to form one unit exhibits a structure which completely corresponds to the DECT frame initially described with reference to FIG. 3. The only difference is the number of slots per frame. This distinction disappears, however, if, as shown in FIG. 1, in each case a number (two in the exemplary embodiment) of individual frames are combined to form one double or multiple frame. In that case, both the DECT frame and the novel multiple frame can have the same number (24) of slots.

One frame or the 12 slots of a frame, respectively, are transmitted within 10 ms. Each slot comprises 480 bits and is transmitted in about 833 $\mu$s (in 833.33 $\mu$s). As indicated in FIG. 1, the 480 bits are distributed over a 32-bit-wide sync field, a 388-bit-wide D field, a 4-bit-wide Z field and a 56-bit-wide guard space field.

Figure 3:
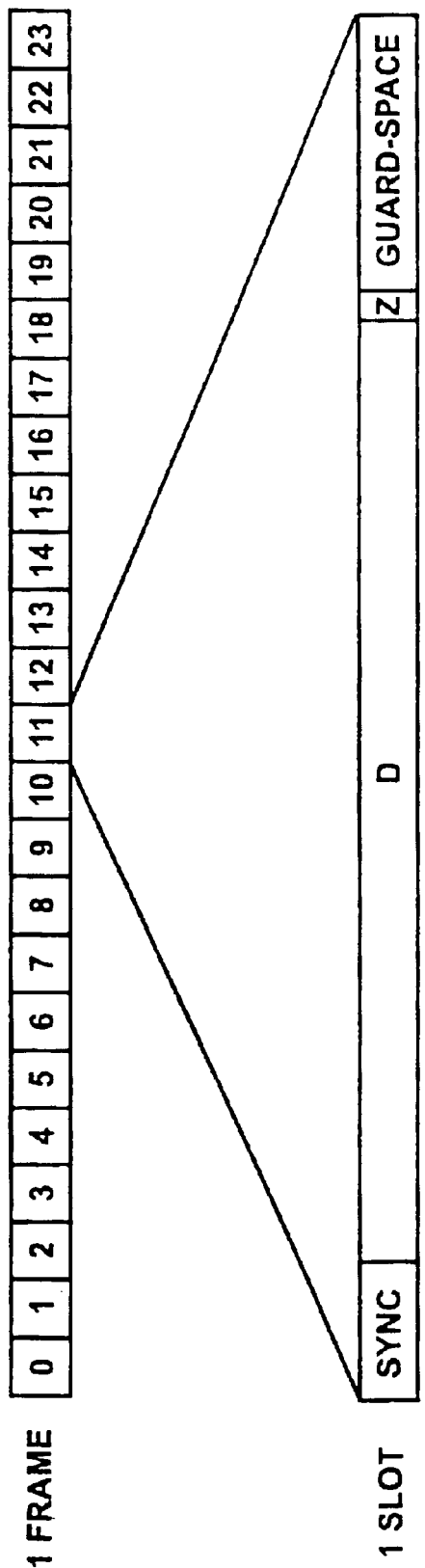
FIG. 3 is a schematic diagram of the data format used in the exchange between a base station and telecommunication terminals, communicating with the former, of a conventional radio system operating in accordance with the DECT standard.

Thus, the structure of the double frame slots according to FIG. 1 completely corresponds to the structure of the DECT frame slots according to FIG. 3. Although the time within which a slot is transmitted is of different length, the structure and the composition of the double frame according to FIG. 1 is identical with the DECT frame according to FIG. 3 as a result of which these can be handled essentially completely identically. In particular, and quite importantly with regard to the above-noted objects of the invention, the baseband chip used in the DECT system can be used with changes or, if at all, with slight modifications.

The slower transmission of the data to be transmitted is preferably caused by the fact that a bit clock determining the transmission speed is appropriately modified, the modification consisting of halving the bit clock frequency in the exemplary embodiment. This halving is preferably effected by inserting a corresponding divider into the bit clock generator.

320 bits are reserved within the D field for the transmission of the user data which are actually of interest (for example speech data). The base station can thus send user data comprising 320 bits to each of the mobile units and receive the same amount of user data from each of the mobile units within 10 ms. The transmission rate for user data between the base station and each of the mobile units is therefore 32 kbit/s in each direction.

This, too, means that there is correspondence between the telecommunication facility according to the invention and the telecommunication facility operating in accordance with the DECT standard.

Therefore, not only the baseband chip but the complete AF (audio-frequency, low frequency) section of the telecommunication facility according to the invention can be taken over from conventional telecommunication facilities almost without modification.

The RF (radio-frequency, high-frequency) section of the telecommunication facility according to the invention, by means of which one or more carrier frequencies, determined by the transmission channel, are modulated in accordance with the data to be transmitted and, respectively, the transmitted data are recovered by demodulation, naturally differs from the RF sections of conventional telecommunication facilities due to the different carrier frequencies. The RF section of the telecommunication facility according to the invention must therefore be modified, i.e. adapted to the new frequencies. Such a change is unavoidable in the case of different transmission channels. However, the effort is reduced due to the synergy effects.

The telecommunication facility constructed and operating as explained above needs a smaller bandwidth for data transmission due to the reduced data transmission rate. The reduction in bandwidths, effected as described, is sufficient for meeting the requirements set in this respect for telecommunication facilities for the 2.4 GHz ISM band.

A telecommunication facility operating in accordance with the DECT standard or another telecommunication facility can be converted into a telecommunication facility designed for the 2.4 GHz ISM band by making only relatively slight and/or simple modifications.

Thus, even though it is based on different technical specifications, the above-described telecommunication facility can be obtained in a relatively simple manner from conventional telecommunication facilities.

We claim:

1. A digital telecommunication facility operating in a non-DECT standard, comprising:

a base station;

at least one cordless mobile unit;

said base station and said at least one cordless mobile unit being adapted to exchange data in units of two or more TDMA frames divided into a number of slots, the total number of slots in TDMA frames forming a unit corresponding to the number of slots in a single frame of a system operating in a DECT-standard;

said base station and said at least one cordless mobile unit being TDMA units originally adapted to exchange data in units of individual, single TDMA frames and modified to exchange data in units of two or more TDMA frames;

said base station and said at least one cordless mobile unit being DECT units originally adapted to exchange data in DECT standard; and a baseband chip for a telecommunication facility operating in the DECT standard.

2. A digital telecommunication facility operating in a non-DECT standard, comprising:

a base station and at least one cordless mobile unit;

said base station and said at least one cordless mobile unit being adapted to exchange data in units of two or more TDMA frames divided into a number of slots; and said units of two or more TDMA frames contain a constant number of slots independent of a number of TDMA frames in each of said units;

said base station and said at least one cordless mobile unit being TDMA units originally adapted to exchange data in units of individual, single TDMA frames and modified to exchange data in units of two or more TDMA frames;

said base station and said at least one cordless mobile unit being DECT units originally adapted to exchange data in DECT standard; and a baseband chip for a telecommunication facility operating in the DECT standard.

3. The telecommunication facility according to claim 2, wherein a structure and an extent of said slots is independent of a number of TDMA frames in each of said units.

4. The telecommunication facility according to claim 1, wherein a time within which a TDMA frame is transmitted is independent of a number of TDMA frames in each unit.

5. The telecommunication facility according to claim 1, which further comprises a frequency divider for dividing a frequency of a bit clock determining a transmission speed of the telecommunication facility.

6. The telecommunication facility according to claim 1, wherein said base station and said at least one cordless mobile unit are adapted to operate in a 2.4 GHz ISM band.

\* \* \* \* \*